United States Patent Office 2,913,916
Patented Nov. 24, 1959

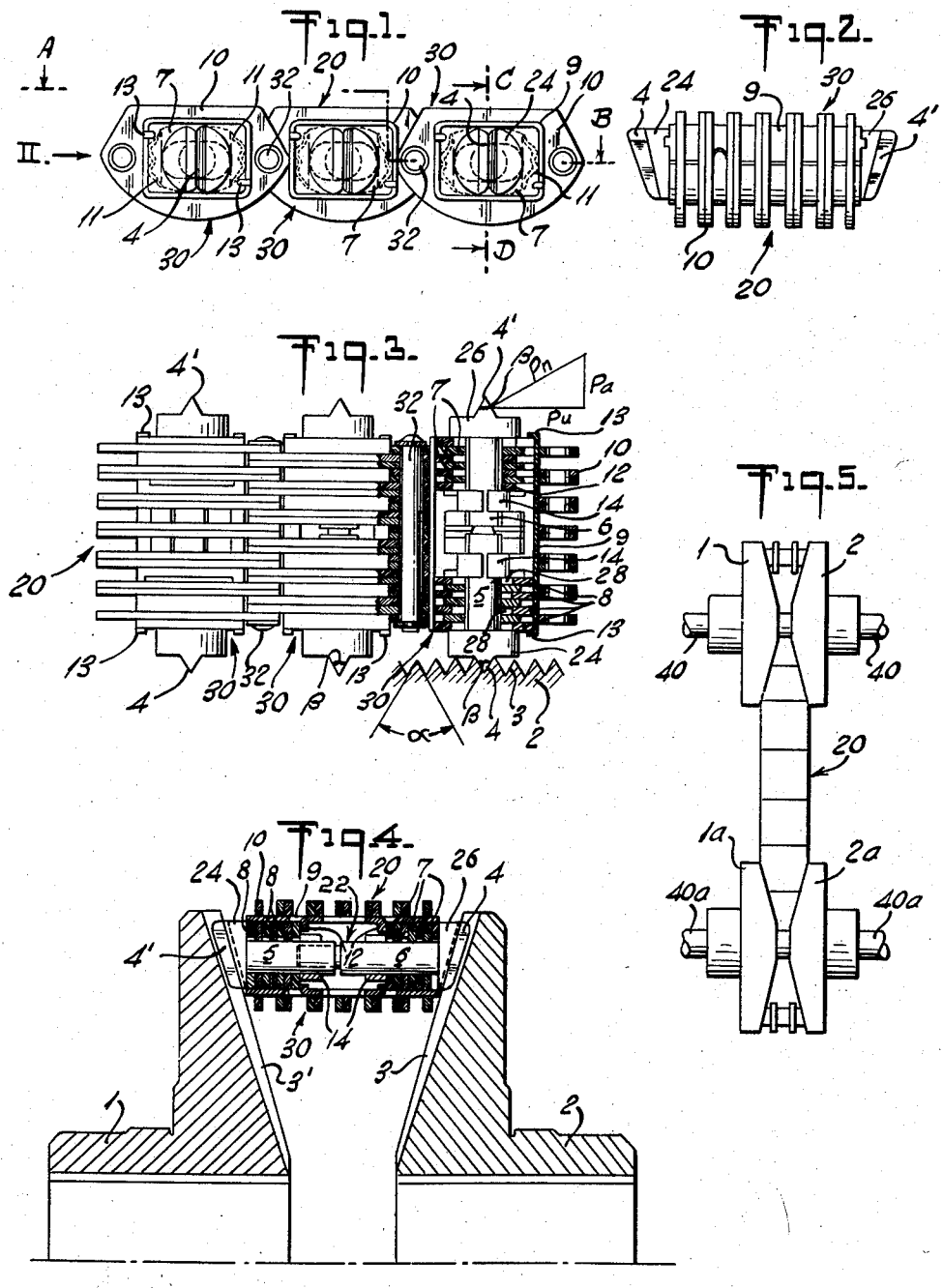

2,913,916

STEPLESS CHANGE SPEED TRANSMISSION

Günter Schmidt, Stalinstadt, Germany

Application August 3, 1956, Serial No. 601,872

Claims priority, application Germany August 24, 1955

8 Claims. (Cl. 74—230.17)

This invention relates to stepless change speed transmissions, and more particularly to a stepless change speed transmission, wherein a first pair of variable conical gear-like members comprising a first pair of oppositely arranged and relatively axially adjustable gear-like toothed conical members is operatively connected with an incoming power shaft, a second pair of variable conical gear-like members comprising a second pair of oppositely arranged and relatively axially adjustable gear-like toothed conical members is operatively connected with an outgoing power shaft, and a chain having teeth-like elements capable of meshing with the teeth of said conical members is in operative engagement with the pairs of conical gear-like members of said two conical members for transmitting power from the first pair of conical members to the second pair of conical members.

An object of the invention is to provide a stepless change speed transmission of above described type, wherein large contacting surfaces between the teeth of the conical members and the teeth of the power transmitting chain are obtained and the entire length and height of the teeth of the power transmitting chain come into engagement with the teeth of conical members.

A further object of the invention is to provide a stepless change speed transmission of above described type, wherein the transmission of power takes place in an elastic way, so that oscillations are dampened and such oscillations are transmitted only to a small extent.

A further object of the invention is to provide a stepless change speed transmission of above described type wherein the plate elements of the chain are subjected to a minimum of strain whereby the life of the transmission is increased.

Another object of the invention is to provide a stepless change speed transmission of above described type having a high degree of efficiency.

A further object of the invention is to improve on the art of stepless change speed transmission of above described type as now customarily made.

The above mentioned objects and advantages, as well as other objects and advantages will be more fully disclosed in the following specification, reference being had to the accompanying drawings forming part of this specification, wherein:

Fig. 1 is a side elevational view of a portion of a power transmitting chain, of a stepless change speed transmission according to the invention, Fig. 2 is an elevational view of a link of the power transmitting chain seen in the direction of the arrow II shown in Fig. 1, Fig. 3 is a top plan view of the power transmitting chain of Fig. 1, partly shown in section taken on line A—B of Fig. 1, said partial sectional view illustrating also teeth of one of the pairs of displaceable cones of a variable conical disk pulley of the stepless change speed transmission, Fig. 4 is a sectional view of the power transmitting chain taken on line C—D of Fig. 1, said sectional view illustrating also a pair of cones of a variable conical gear-like member of the stepless change speed transmission, and Fig. 5 is a diagrammatical illustration of a stepless speed change transmission according to the invention.

Referring now to Figs. 1–4, 1 and 2 generally denote the axially displaceable driving cones of a variable conical toothed gear-like member. Each of said cones 1 and 2 is provided with radially extending teeth 3 and 3' respectively. The teeth 3 and 3' of the two conical members 1, 2 face each other. The teeth 4 and 4' of a power transmitting chain generally indicated by 20 may be positively engaged with the teeth 3 and 3' of the pair of conical members 1 and 2. The shape of the teeth 4, 4' having a triangular cross-section corresponds fully to the shape of the grooves between adjacent teeth 3 or adjacent teeth 3' of the conical members 1 and 2 respectively. The pair of oppositely arranged and relatively axially adjustable conical members 1, 2 is operatively connected with an incoming power shaft 40a (see Fig. 5). A second pair of similar axially displaceable conical members 1a, 2a of a second variable conical toothed gear-like member mounted on an outgoing power shaft 40a (see Fig. 5) is also engaged by the power transmitting chain 20.

The contact between the teeth 4 and 4' of the power transmitting chain 20 and the teeth 3 and 3' of the pair of conical members 1, 2 extends over the whole of the faces of the teeth. This feature results in a comparatively low strain of the material. Furthermore, in comparison with hitherto known transmissions including form-constrained pulling members, a considerable increase in the power transmitting surfaces between the teeth 4, 4' of the chain 20 and the teeth 3, 3' of the conical members is obtained, whereby a substantial increase in the efficiency and the life of the transmission is rendered possible.

As may be gathered from the drawings, each link of the chain 20 has a two-piece pin 22 comprising the two parts 5 and 6 disengageably engaged with each other. Each part 5, 6 of the two-piece pin 22 has a head 24, 26 respectively. The teeth 4 and 4' are arranged at the heads 24 and 26 of the two-piece pin 22. A series of spaced plate elements 7 curved at their upper and lower side are mounted on said two-piece pin 22. A series of additional spaced plate elements 8, each having a longitudinal slot 28, is slidably engaged with the pin 22; the plates 8 alternate with the plates 7. The extreme plates 8 are in abutting engagement with the heads 24 and 26 of the pin 22. Each pin 22 with the plates 7 and 8 engaged therewith is inserted into a housing 9. Each housing 9 in turn is inserted into the apertures of a series of spaced connecting plates 10 of the power transmitting chain 20, whereby a link 30 of the latter is formed. The connecting plates 10 of adjacent links 30 of the chain 20 are pivotally connected with each other by pins 32. Owing to above described construction the teeth 4, 4' having an angle β equal to the angle α of the teeth 3 may be displaced in accordance with the respective position of the teeth 3, 3' of the conical members 1, 2 when, during the operation of the transmission, the chain 20 comes into engagement with the conical members 1, 2 of the variable disk pulley, i.e. the two-piece pins 22 carrying the teeth 4, 4' may be displaced somewhat in the housings 9 of the links 30 in the direction of movement of the chain 20.

As best shown in Fig. 1, springs 11 engaged with the housing 9 act on each plate element 7 for holding same and, thus, the two-piece pins 22 engaged therewith in a center or mean position relative the housing 9 and the connecting plates 10 engaged with the latter when the respective link 30 of the chain 20 is disengaged from the axially displaceable conical members 1 and 2 of the variable conical gear-like member.

The two-piece pins 22 are prevented from a lateral sliding out of the plate elements 7 and 8 by resilient sleeves 14 when the chain is disengaged from the conical members 1 and 2 of the conical disk pulley.

When a link 30 of the chain 20 comes into engagement with the conical members 1 and 2 of the variable conical gear-like member, the teeth 4 and 4', owing to their triangular or roof-like form, are displaced together with the parts 5, 6 of the two-piece pin 22 in correspondence with the teeth 3, 3' on the conical members 1 and 2, so that they come gradually into complete contact with the teeth 3 and 3' on the conical members 1 and 2.

The peripheral force $P_u$ (see Fig. 3) may be resolved into the normal force $P_n$, perpendicular to the face of the tooth, and the axial force $P_a$, acting axially on the parts 5 and 6 of the two-piece pin 22. The axial force $P_a$ is resisted by the lugs 12 bent inwardly from the wall of the housing 9 (see Figs. 3 and 4). Additional lugs 13 of the housing 9 prevent the plate elements 7 and 8 from disengagement from the housing 9 when the pins 5 and 6 of the two-piece pin 22 carrying the teeth 4 and 4' are removed. The axial force $P_a$ presses the plates 7 and 8 against each other so that the peripheral force $P_u$ introduced into the link construction of the chain by the teeth 3, 3' and 4, 4', fully matching in form, is transmitted frictionally through the plate elements 8 into the housings 9 from where it is transmitted to the connecting plates 10 of the power transmitting chain 20.

If the peripheral force $P_u$ is to be transmitted frictionally as required, the following equation applies:

$$n \cdot \mu \cdot P_a \geq P_u$$

wherein the symbols have the following denotations:

$n$ is the number of friction surfaces
$\mu$ is the coefficient of the adhesive friction
$P_a$ is the axial shearing, and
$P_u$ is the peripheral force to be transmitted The total peripheral force is frictionally transmitted if this condition is fulfilled. This type of frictional transmission of power has the advantage of causing an elastic transmission of the power. There is no or only a negligible transmission of undesired oscillations from one pair of conical members to the other pair of conical members operatively connected with each other by the power transmitting chain 20.

As will be understood from above, the transmission of power in the stepless change speed transmission shown in the drawings is obtained by single-piece teeth 4, 4' of the power transmitting chain arranged on a two-piece pin 22, at both sides of which frictional plate elements 7, 8 are arranged. The two-piece pin 22 comprising the axially disengageable parts 5 and 6 and the frictional plate elements 7, 8 are inserted into a housing 9 of the respective link 30 of the chain 20.

I have described a preferred embodiment of my invention, but it is understood that this disclosure is for the purpose of illustration, and that various omissions and changes in shape, proportion and arrangement of parts, as well as the substitution of equivalent elements for the arrangements shown and described may be made without departing from the spirit and scope of the invention as set forth in the appended claims.

What I claim is:

1. In a stepless change speed transmission, the combination of: two pairs of variable conical gear-like members, each of said pair of variable conical gear-like members including a first and a second bevel toothed member axially adjustable relative to each other, the teeth of said two members facing each other, and a power transmitting chain including a plurality of pivotally interconnected links, each link including means carrying teeth at opposite ends thereof for engagement with teeth of the bevel members facing each other, said teeth carrying means being in the shape of a two-piece pin consisting of two axially disengageable parts, said teeth carrying means being displaceably mounted in the respective link for displacement in the direction of movement of said chain when the teeth of the bevel members are engaged by said teeth of the teeth carrying means.

2. In a stepless change speed transmission, the combination of: two pairs of variable conical gear-like members, each of said pair of variable conical gear-like members including a first and a second bevel toothed member axially adjustable relative to each other, the teeth of said two members facing each other, and a power transmitting chain including a plurality of pivotally interconnected links, each link including means carrying teeth at opposite ends thereof for engagement with teeth of the bevel members facing each other, said teeth carrying means being in the shape of a two-piece pin consisting of two axially disengageable parts, said teeth carrying means being displaceably mounted in the respective link for displacement in the direction of movement of said chain, when the teeth of the bevel members are engaged by said teeth of the teeth carrying means, and resilient means acting on said teeth carrying means for urging same into a mean position.

3. In a stepless change speed transmission, the combination of: two pairs of variable conical gear-like members, each of said pair of variable conical gear-like members including a first and a second bevel toothed member axially adjustable to each other, the teeth of said two members facing each other, and a power transmitting chain including a plurality of pivotally interconnected links, each link including means carrying teeth at opposite ends thereof for engagement with teeth of the bevel members facing each other, said teeth carrying means being in the shape of a two-piece pin consisting of two axially disengageable parts, said teeth carrying means being displaceably mounted in the respective link for displacement in the direction of movement of said chain when the teeth of the bevel members are engaged by said teeth of the teeth carrying means, and, the teeth of said teeth carrying means having a triangular cross-section.

4. In a stepless change speed transmission, the combination of: two pairs of variable conical gear-like members, each of said pair of variable conical gear-like members including a first and a second bevel toothed member axially adjustable relative to each other, the teeth of said two members facing each other, and a power transmitting chain including a plurality of pivotally interconnected links, each link including means carrying teeth at opposite ends thereof for engagement with teeth of the bevel members facing each other, said teeth carrying means being in the shape of a two-piece pin consisting of two axially disengageable parts, said teeth carrying means being displaceably mounted in the respective link for displacement in the direction of movement of said chain when the teeth of the bevel members are engaged by said teeth of the teeth carrying means, the teeth of said teeth carrying means having a triangular cross-section, the teeth of said bevel members having a triangular cross-section, and the angle at the apex of the cones of said conical cross-sections being identical.

5. In a stepless change speed transmission, the combination of: two pairs of variable conical gear-like members, each of said pair of variable conical gear-like members including a first and a second bevel toothed member axially adjustable relative to each other, the teeth of said two members facing each other, and a power transmitting chain including a plurality of pivotally interconnected links, each link including means carrying teeth at opposite ends thereof for engagement with teeth of the bevel members facing each other, said link including first frictional means positively engaged with the body of said link, and second frictional means positively engaged with said teeth carrying means, said first and second frictional means being engaged with each other, and means for holding said first and second frictional means in engagement with each other.

6. In a stepless change speed transmission, the combination of: two pairs of variable conical gear-like members, each of said pair of variable conical gear-like members including a first and a second bevel toothed member axially adjustable relative to each other, the teeth of said two members facing each other, and a power transmitting chain including a plurality of pivotally interconnected links, each link including means carrying teeth at opposite ends thereof for engagement with teeth of the bevel members facing each other, said link including a housing, connecting plates carrying said housing and pivotally connected with corresponding connecting plates of adjacent links, a plurality of first spaced plates arranged in said housing and engaged therewith, said first spaced plates having longitudinally extending slots, and a plurality of second spaced plates arranged in said housing and engaged with said teeth carrying means, said teeth carrying means passing through said slots of the first spaced plates, and said first and second spaced plates being frictionally engaged with each other.

7. In a stepless change speed transmission, the combination of: two pairs of variable conical gear-like members, each of said pair of variable conical gear-like members including a first and a second bevel toothed member axially adjustable relative to each other, the teeth of said two members facing each other, and a power transmitting chain including a plurality of pivotally interconnected links, each link including means carrying teeth at opposite ends thereof for engagement with teeth of the bevel members facing each other, said teeth carrying means being in the shape of a two-piece pin consisting of two axially disengageable parts, said link including a housing, connecting plates carrying said housing and pivotally connected with corresponding connecting plates of adjacent links, a plurality of first spaced plates arranged in said housing and engaged therewith, said first spaced plates having longitudinally extending slots, a plurality of second spaced plates arranged in said housing and engaged with said two-piece pin, said two-piece pin passing through said slots of the first spaced plates, heads at opposite ends of said two-piece pin, said teeth being arranged on said heads, said heads being in engagement with the outermost plates, and abutting means within said housing for abutting engagement with the innermost plates.

8. In a stepless change speed transmission, the combination of: two pairs of variable conical gear-like members, each of said pair of variable conical gear-like members including a first and a second bevel toothed member axially adjustable relative to each other, the teeth of said two members facing each other, and a power transmitting chain including a plurality of pivotally interconnected links, each link including means carrying teeth at opposite ends thereof for engagement with teeth of the bevel members facing each other, said teeth carrying means being in the shape of a two-piece pin consisting of two axially disengageable parts, said link including a housing, connecting plates carrying said housing and pivotally connected with corresponding connecting plates of adjacent links, a plurality of first spaced plates arranged in said housing and engaged therewith, said first spaced plates having longitudinally extending slots, a plurality of second spaced plates arranged in said housing and engaged with said two-piece pin, said two-piece pin passing through said slots of the first spaced plates, heads at opposite ends of said two-piece pin, said teeth being arranged on said heads, said heads being in engagement with the outermost plates, abutting means arranged within said housing for abutting engagement with the innermost plates, and resilient means engaged with said housing and said second spaced plates for urging same and the two-piece pin engaged therewith into a mean position.

References Cited in the file of this patent

UNITED STATES PATENTS

| | | |
|---|---|---|
| 2,330,058 | Keller | Sept. 21, 1943 |
| 2,458,682 | Couper | Jan. 11, 1949 |
| 2,589,887 | Sprague | Mar. 18, 1952 |